Jan. 17, 1950  F. L. WEINHEIMER, SR  2,495,082
COASTER BRAKE FOR WHEELED VEHICLES
Filed Dec. 9, 1947  2 Sheets-Sheet 1
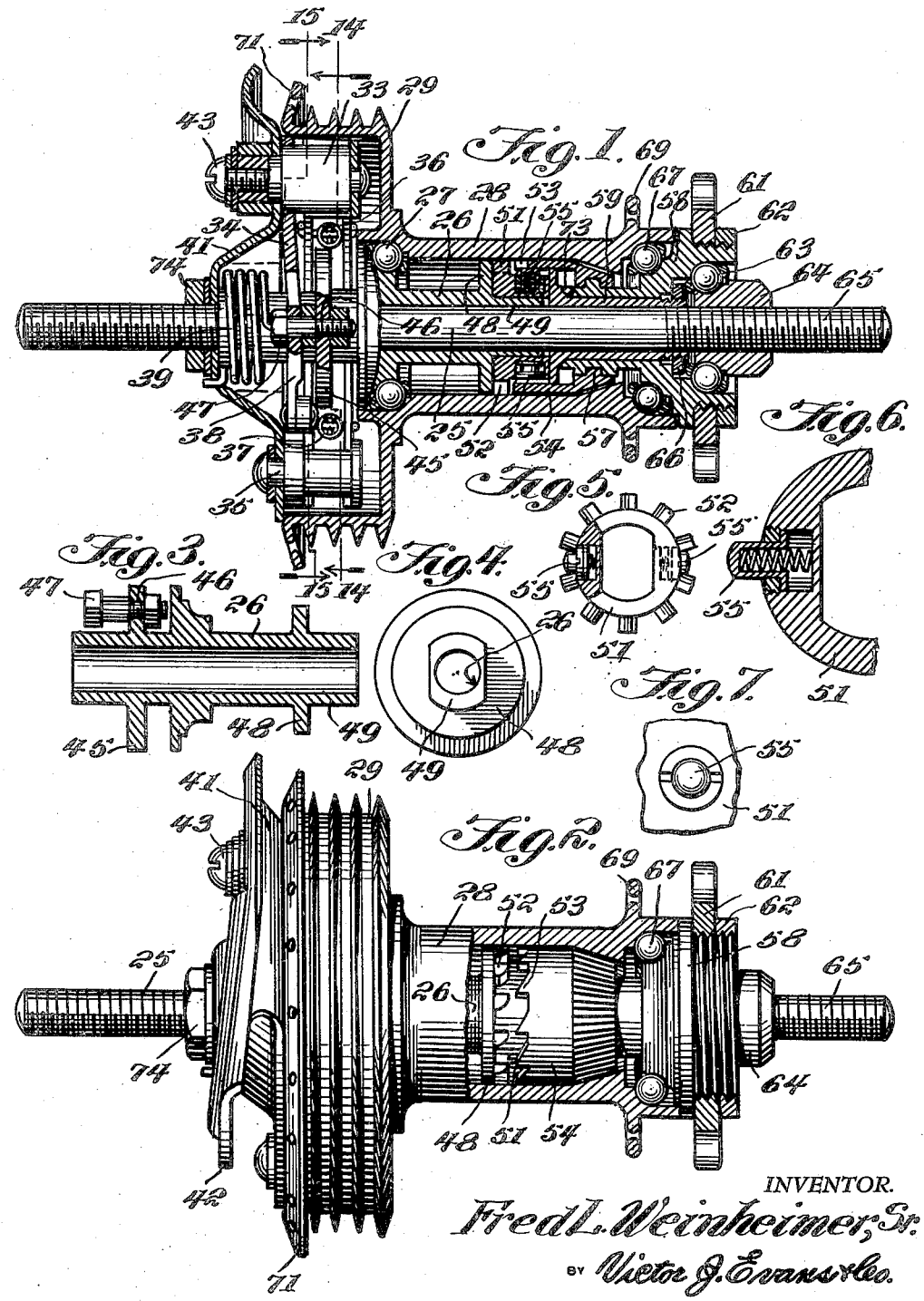
INVENTOR.
Fred L. Weinheimer, Sr.
BY Victor J. Evans & Co.
ATTORNEYS

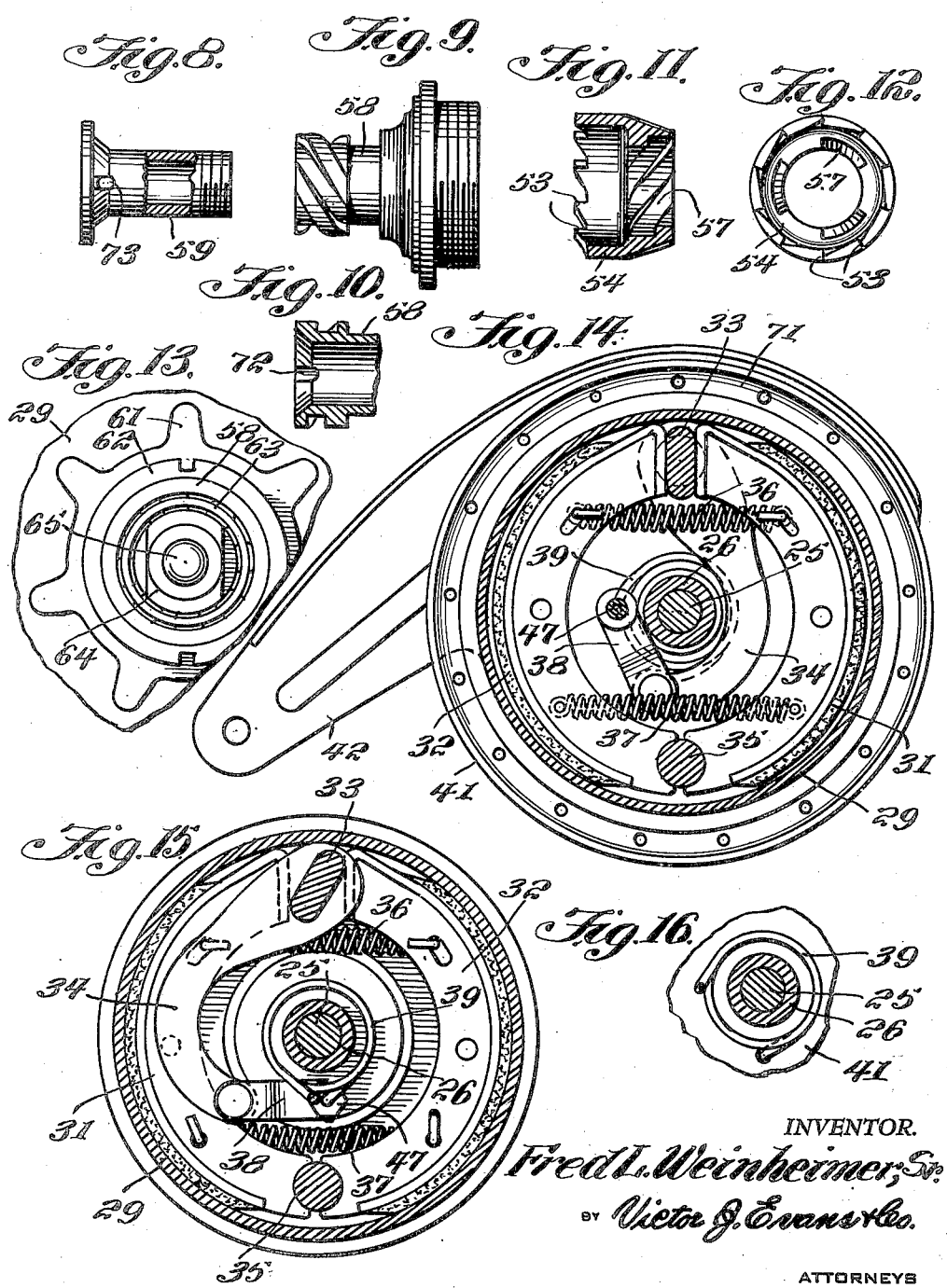

Patented Jan. 17, 1950

2,495,082

UNITED STATES PATENT OFFICE 2,495,082

COASTER BRAKE FOR WHEELED VEHICLES

Fred L. Weinheimer, Sr., South River, N. J.

Application December 9, 1947, Serial No. 790,504

4 Claims. (Cl. 192—6)

This invention relates to a coaster brake for wheeled vehicles.

It is an object of the present invention to provide in a brake adapted for wheeled vehicles an arrangement including separable braking elements and a simple mechanism for operating the same operable from a sprocket by reverse motion upon the same, the brake thereby including brake bands and a drum and adapted for use on wheeled vehicles of the bicycle type.

Other objects of the present invention are to provide a coaster brake for light weight vehicles operable by a chain and sprocket which is of simple construction, of minimum and sturdy parts, inexpensive to manufacture, compact and efficient in operation.

For other objects and for a better understanding of the invention, reference may be had to the following detailed description taken in connection with the accompanying drawing, in which Fig. 1 is a transverse sectional view taken through the coaster brake embodying the features of the present invention.

Fig. 2 is an elevational view of the brake with portions broken away to show the interior clutching parts.

Fig. 3 is a longitudinal sectional view of an internal sleeve.

Fig. 4 is an end elevational view of the sleeve shown in Fig. 3.

Fig. 5 is a face elevational view of one of the clutch parts.

Fig. 6 is an enlarged fragmentary view taken through the clutch part and upon its drag pin.

Fig. 7 is an enlarged front elevational view looking upon the drag pin and upon the side of the clutch part.

Fig. 8 is a side elevational view of a bearing sleeve forming one of the parts of the brake and on which is journalled the spiral thread part shown in Fig. 9.

Fig. 9 is a side elevational view of the spiral thread part to which the operating sprocket is connected.

Fig. 10 is a fragmentary longitudinal sectional view of the threaded clutch part shown in Fig. 9.

Fig. 11 is a longitudinal sectional view of a cooperating clutch part adapted to be operated by the threaded clutch part shown in Fig. 9.

Fig. 12 is an end elevational view of the clutch part shown in Fig. 11.

Fig. 13 is an end elevational view looking upon the sprocket wheel of the brake.

Fig. 14 is an enlarged sectional view taken on line 14—14 of Fig. 1.

Fig. 15 is a transverse sectional view of the brake band parts taken on line 15—15 of Fig. 1.

Fig. 16 is a fragmentary view of a portion of the structure shown in Fig. 15 showing the return spring of the cam operating arm expanded to permit the operation of the brake elements and the rotation of the cam thereinbetween.

Referring now to the figures, 25 repesents a pintle shaft on which the various parts of the brake are assembled. Surrounding the shaft at a central location is a sleeve 26 adapted to support a ball bearing unit 27 on which rides an external casing 28 having an enlargement 29 thereon forming a brake drum with which internal and separable brake elements 31 and 32 engage when separated by a cam 33 operated by arm 34. The brake elements 31 and 32 pivot about a stop pin 35. Tension springs 36 and 37, Fig. 14, retract the brake elements when the cam 33 is angled to release the brake parts. The arm 34 is connected by a link 38, Fig. 15, with one end of a spring 39 which is operable to return the cam 33. The spring 39 is anchored upon a fixed part 41 which is in the form of a plate adapted to fit over the open end of the enlargement 29 to carry the cam 33 and the pin 35. The member 41 has an anchor arm 42 which can be fixed to the frame of the vehicle. The cam 33 is secured to the member 41 by a fastening screw 43. On the sleeve 26 there is a flange 45 having a hole 46 adapted to receive a screw 47 that attaches the link 38 with the sleeve flange 46. As the sleeve 28 is rotated, the cam 33 will accordingly be adjusted. The spring end 39 enters the bolt 47 to anchor the spring with the arrangement so as to return the cam 33 to its retracted position.

On the other end of sleeve 26, is a flange 48 and a flat sided portion 49. This flat sided portion 49 receives a toothed clutch member 51 having circumferentially spaced teeth 52 adapted to be locked with clutch teeth 53 of a clutch member 54, Figures 11 and 12. Drag pins or detents 55 will engage with the under face of the clutch member 54 to maintain a drag on the clutch member 54. Thus the member 54 will screw itself in or out, as the case may be, to apply the brake or engage the clutch member. If the drag pins were not so positioned, the clutch member 54 would rotate with the part 58 and would not function after threaded at a point just centrally of the clutch face surface of the member 51 and the clutch teeth 53 of the clutch member 54.

The clutch part 51 will, accordingly, drive the sleeve 26.

The clutch member 54 has an internally threaded portion 57 with which a threaded part 58, Figures 9 and 10, engages. The threaded part 58 is journalled on a sleeve 59 on the shaft 25, and as the part 58 is rotated in one direction by the operator of the vehicle, the clutch member 54 will be advanced into engagement with the teeth 52 of the clutch member 51 whereby to cause the rotation of the sleeve 26 and consequently the application of the brake elements 31 and 32. When the part 58 is released, the braking elements will be retracted, the clutch member 54 having been retracted from the clutch part 51.

The threaded part 58 has a sprocket 61 secured to it by a nut 62. A ball bearing unit 63 is retained by a nut 64 workable on the shaft 25 over a threaded portion 65 thereof. A nut 66 retains the part 58 on the sleeve 59, Figure 1. A second ball bearing unit is extended between the threaded part 58 and the casing 28, as indicated at 67. The casing has flange portions 69 and 71 with openings therein for receiving wire spokes.

The part 58 has a groove on its inner periphery as indicated at 72, Figure 10, which will engage with a projection 73 of the sleeve 59. A nut 74 secures the member 41 in place on the shaft 25.

There has thus been provided, a coaster brake which, by reverse action of the pedals on the wheeled vehicle, will apply the brake elements to the brake drum with a small amount of pressure, and in such a manner that the brake drum will not score or burn up from contact with the brake elements.

The coaster brake can be used on long inclines or steep hills without injury to the brake drum or the component parts of the coaster brake.

The coaster brake is damage-proof mechanically, and it automatically adjusts itself for the duration of the life of the brake elements until the elements are worn down to the rivets holding the elements to the brake shoe.

Forward rotation of the wheel carrying the coaster brake returns the brake to off position if the return spring is broken on the rotating cam. Thus the brake will always return to non-braking position.

During the reverse rotation of the wheel, the brake cannot slip, due to the ratchet of the clutch member pulling the clutch member into close mesh with the threaded part 58 as it rotates in reverse.

The coaster brake can be used on powered bicycles at high speed without danger in stopping, since the brake elements will not score the drum in their engagement therewith.

The brake elements are easily replaced, and there is no friction drag when the brake is in off position, due to the fact that the brake lining does not contact the brake drum.

Since it is apparent that the coaster brake is operated by reverse action on the pedals, it is believed that the foregoing description will clearly illustrate the construction of the coaster brake, and it is to be understood that changes in the minor details of construction, arrangement and combination of parts may be resorted to, provided they fall within the spirit of the invention and the scope of the appended claims.

Having thus described my invention, I claim:

1. A coaster brake comprising a central spindle shaft, a sleeve rotatable upon the shaft, a casing extended about the sleeve and having an enlargement with an internal brake drum surface, a member adapted to be extended over the open end of the enlargement and to be anchored to a vehicle, brake elements adapted to be separated from one another to have frictional engagement with the brake drum surface, operating means connected between the brake elements and the sleeve so that upon rotation of the sleeve upon the shaft and within the casing, the brake elements can be operated, said operating means comprising a cam pivoted upon the member adapted to be fixed to the vehicle, an arm extending from the cam, a link connecting the end of the arm to the sleeve whereby upon operation of the sleeve the cam arm will be operated, a return spring extending between the fixed member and the parts connecting the arm with the sleeve, a clutch member fixed to the sleeve, a cooperating clutch member and a sprocket member adapted to operate the cooperating clutch member to effect in one rotation of the sprocket member the advancement of the cooperating clutch member toward the clutch member on the sleeve.

2. A coaster brake comprising a central spindle shaft, a sleeve rotatable upon the shaft, a casing extended about the sleeve and having an enlargement with an internal brake drum surface, a member adapted to be extended over the open end of the enlargement and to be anchored to a vehicle, brake elements adapted to be separated from one another to have frictional engagement with the brake drum surface, operating means connected between the brake elements and the sleeve so that upon rotation of the sleeve upon the shaft and within the casing, the brake elements can be operated, said operating means comprising a flange on said sleeve, a cam extending between the brake elements to expand the same, an arm extending from the cam, a link connecting the free end of the arm with the flange on the sleeve, a fastening bolt adapted to extend between the link and the flange, said fastening bolt having an opening therein, a return spring extending between the member adapted to be fixed to the vehicle and into the opening of the fastening bolt and serving to return the cam element when the same is released by the sleeve, a clutch member fixed to the sleeve, a cooperating clutch member and a sprocket member adapted to operate the cooperating clutch member to effect in one rotation of the sprocket member the advancement of the cooperating clutch member toward the clutch member on the sleeve.

3. A coaster brake as defined in claim 1 wherein said sprocket member is provided with a threaded portion and said cooperating clutch member is adapted to be operated by the sprocket member having a cooperating threaded portion so the rotational movement of the sprocket member will cause axial movement of the cooperating clutch member.

4. A coaster brake as is defined in claim 1 wherein the clutch member on the sleeve is removable therefrom in an axial direction, but retained on the sleeve against rotational movement with respect thereto, a second sleeve on the shaft with said sprocket member being disposed on the second sleeve and said sleeve is adapted to engage with the clutch member of the first sleeve to retain the same in place on the first sleeve against axial displacement therefrom, and slot and projection means are provided that extending between the sprocket member and the second sleeve retain the same against rotational displacement relative to one another, and a fastening member is provided which extends between the second sleeve and the sprocket member to retain the sprocket member on the second sleeve against axial displacement with respect thereto.

FRED L. WEINHEIMER, Sr.

REFERENCES CITED

The following references are of record in the file of this patent:

UNITED STATES PATENTS

| Number | Name | Date |
|---|---|---|
| 661,022 | Ringle | Oct. 30, 1900 |
| 706,549 | Glover | Aug. 12, 1902 |
| 721,018 | Clark | Feb. 17, 1903 |
| 724,739 | Robinson | Apr. 7, 1903 |
| 897,952 | Ainsworth | Sept. 8, 1908 |
| 968,604 | Robinson | Aug. 30, 1910 |
| 1,060,511 | Svenson | Apr. 29, 1913 |
| 1,089,997 | Walker | Mar. 10, 1914 |
| 1,280,558 | Schmidt | Oct. 1, 1918 |
| 1,564,515 | Bower | Dec. 8, 1925 |

FOREIGN PATENTS

| Number | Country | Date |
|---|---|---|
| 43,179 | Netherlands | May 16, 1938 |
| 165,363 | Switzerland | Jan. 16, 1934 |